US010288818B2

(12) United States Patent
Madhav

(10) Patent No.: US 10,288,818 B2
(45) Date of Patent: May 14, 2019

(54) CABLE BEND LIMITER ADAPTER

(71) Applicant: The Boeing Company, Chicago, IL (US)

(72) Inventor: Jagdish T. Madhav, Bothell, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 15/494,235

(22) Filed: Apr. 21, 2017

(65) Prior Publication Data
US 2018/0306980 A1 Oct. 25, 2018

(51) Int. Cl.
G02B 6/38 (2006.01)
G02B 6/44 (2006.01)
B64D 11/00 (2006.01)
F21V 8/00 (2006.01)

(52) U.S. Cl.
CPC ......... *G02B 6/3825* (2013.01); *G02B 6/3887* (2013.01); *G02B 6/4478* (2013.01); *B64D 2011/0038* (2013.01); *G02B 6/0008* (2013.01); *G02B 6/4471* (2013.01)

(58) Field of Classification Search
CPC .. G02B 6/3825; G02B 6/3829; G02B 6/3887; G02B 6/4471; G02B 6/4477; G02B 6/4478
USPC .... 385/76–78, 134, 136, 137, 139; 174/664, 174/665; 362/555, 576, 581, 647, 362/649–656
See application file for complete search history.

(56) References Cited

U.S. PATENT DOCUMENTS

| 5,532,711 | A | * | 7/1996 | Harris | G02B 6/0008 340/815.42 |
| 5,740,296 | A | * | 4/1998 | Harris | G02B 6/0008 362/551 |
| 5,778,122 | A | * | 7/1998 | Giebel | G02B 6/3825 385/137 |
| 6,056,245 | A | * | 5/2000 | White | H02G 3/30 174/135 |
| 6,148,133 | A | | 11/2000 | Daoud | |
| 6,321,017 | B1 | * | 11/2001 | Janus | G02B 6/4478 385/134 |
| 6,377,735 | B1 | * | 4/2002 | Bernstein | G02B 6/4446 385/100 |
| 6,535,681 | B2 | * | 3/2003 | Daoud | G02B 6/4452 385/134 |
| 6,860,650 | B2 | | 3/2005 | Kunkel et al. | |
| 7,581,564 | B2 | * | 9/2009 | Tanaka | F16L 21/06 138/110 |
| 8,452,151 | B2 | * | 5/2013 | Schroeder | H01R 13/60 174/660 |

(Continued)

*Primary Examiner* — Robert Tavlykaev
(74) *Attorney, Agent, or Firm* — Kwan & Olynick LLP

(57) ABSTRACT

In general, certain embodiments of the present disclosure provide an adapter for routing, supporting and protecting a filamentary medium from sharp bends and kinking. According to various embodiments, an adapter is provided comprising a body having an entrance end, the entrance end including a hemi-toroidal portion to form a through-hole in the body for receiving a distal portion the filamentary medium. In some embodiments, a proximal portion of the filamentary medium bends over a curved surface of the hemi-toroidal portion away from the through-hole while the distal portion of the filamentary medium is passed through the through-hole.

23 Claims, 11 Drawing Sheets

(56) References Cited

U.S. PATENT DOCUMENTS

| | | | |
|---|---|---|---|
| 8,764,485 B2 * | 7/2014 | Hohner | H01R 9/0527 |
| | | | 439/607.42 |
| 8,944,658 B1 | 2/2015 | Madhav et al. | |
| 9,696,512 B2 * | 7/2017 | Miller | G02B 6/4459 |
| 2002/0136520 A1 * | 9/2002 | Janus | G02B 6/4478 |
| | | | 385/134 |
| 2012/0139409 A1 * | 6/2012 | Kishimoto | C09K 11/7721 |
| | | | 313/483 |

* cited by examiner

CABLE BEND LIMITER ADAPTER

TECHNICAL FIELD

The present disclosure relates generally to wiring adapters, and, more specifically, to adapters for routing, supporting and protecting filamentary media such as optical fibers.

BACKGROUND

Filamentary media such as optical fibers have become an essential part to nowadays infrastructures and communication technologies given their superior signal transmission capabilities. Taking optical fibers for example, an optical fiber cable consists of a plurality of optical fibers surrounded by protective sheath. Each individual optical fiber consists of a small diameter core of materials such as glass or plastic cladded by a surrounding protection having a lower index of refraction than the core. Even though optical fibers are designed for near total reflection of light propagating therethrough, when an optical fiber is bent past a critical radius, light rays transmitted no longer are fully reflected within the core of the optical fiber and therefore no longer traverse the optical fiber, resulting in signal loss or degradation. Therefore, extra care is required when it comes to handling and routing optical fiber cables to avoid sharp bends or kinking in the fibers in order to achieve reliable signal transmission.

Panel illumination for interiors of vehicles such as airplanes or automobiles is an important application utilizing optical fiber delivered lighting. For example, an aircraft cabin lighting system can be designed to provide decorative patterns of light on aircraft cabin ceilings, with optical fibers providing optical communication from a light source to the one or more illuminating points. Presently, when optical fibers that are horizontally guided on a surface of a panel access light pipes vertically inserted in the panel, reinforcement at the exterior of the optical fiber cable at such accessing locations is used so that the cable does not bend past a radius too sharp, e.g., along a curve having a radius less than the critical radius of the fibers. However, such reinforcement techniques are not only cumbersome to implement, but also add weights to vehicles such as an aircraft where weight reduction is of great significance.

Thus, there is a need for an adapter for routing, supporting and protecting a filamentary medium, without sharp bending or kinking, in compliance with the critical bend radius of the filamentary medium.

SUMMARY

The following presents a simplified summary of the disclosure in order to provide a basic understanding of certain embodiments of the present disclosure. This summary is not an extensive overview of the disclosure and it does not identify key/critical elements of the present disclosure or delineate the scope of the present disclosure. Its sole purpose is to present some concepts disclosed herein in a simplified form as a prelude to the more detailed description that is presented later.

In general, certain embodiments of the present disclosure provide adapters, methods and systems by use thereof for routing, supporting and protecting a filamentary medium without sharp bending or kinking in the medium. According to various embodiments, an adapter is provided comprising a body having an entrance end, where the entrance end includes a hemi-toroidal portion forming a through-hole in the body for receiving a distal portion of a filamentary medium. A proximal portion of the filamentary medium bends over a curved surface of the hemi-toroidal portion away from the through-hole while the distal portion of the filamentary medium is passed through the through-hole.

In some embodiments, the entrance end of the adapter is formed by a first part and a second part of the body for mating together; each of the first part and the second part includes a corresponding hemi-toroidal half portion that forms the hemi-toroidal portion of the body when the first part and second part are mated. In some embodiments, the filamentary medium is a first fiber-optic cable.

In some embodiments, the adapter further comprises a recessed groove in the body for receiving a cylindrical ferrule for surrounding a portion of the filamentary medium. In some embodiments, the ferrule, once engaged with the adapter, is disposed at least partially within the body for holding a portion of the filamentary medium. In some embodiments, the ferrule has a collar portion corresponding to a recess in the body to secure the ferrule in place and restrains the movement of fiber cable.

In some embodiments, the ferrule holds a first end portion of a first fiber-optic cable about a mid-point of the ferrule, and is adapted to receive a second end portion of a second fiber-optic cable so the first end portion and the second end portion are in optical communication with each other.

In some embodiments, the adapter may further comprise a gasket member for surrounding a portion of the body to form a seal when the body is in contact with a corresponding component.

In some embodiments, a radius of the curved surface of the adapter is no less than a critical radius of the filamentary medium. In some embodiments, the radius is no less than twice a diameter of the filamentary medium plus a predetermined safety factor. In some embodiments, the safety factor is about 25%.

In some embodiments, the adapter may further comprise a hinge portion that joins the first part and the second part, the first part and second part being mated together when folded along the hinge. In some embodiments, the hinge portion is a living hinge. In some embodiments, the hinge portion is removed after mating. In some embodiments, the hinge is a standard hinge. In some cases, a rubber "O" ring is place abound both pieces to keep them together as well as it acts as moisture barrier, preventing contamination near tip of the fiber, resulting in light/signal loss.

In some embodiments, the adapter may yet further comprise a mounting mechanism for securing the adapter to a filamentary medium coupling component. In some embodiments, the mounting mechanism includes a plurality of flexible fins for locking a portion of the body in place with the filamentary medium coupling component. In some embodiments, the mounting mechanism includes an attachment surface for attaching the adapter onto the filamentary medium coupling component.

In yet another embodiment of the present disclosure, a method is provided for securing a filamentary medium without sharp bending or kinking thereof, to a filamentary medium coupling component by use of an adapter. According to various embodiments, the adapter comprises a body having an entrance end, where the entrance end includes a hemi-toroidal portion forming a through-hole in the body for receiving a distal portion of a filamentary medium. A proximal portion of the filamentary medium bends over a curved surface of the hemi-toroidal portion away from the through-hole while the distal portion of the filamentary medium is passed through the through-hole.

In still yet another embodiment of the present disclosure, an aircraft is provided for having a filamentary medium secured by an adapter. According to various embodiments, the adapter comprises a body having an entrance end, where the entrance end includes a hemi-toroidal portion forming a through-hole in the body for receiving a distal portion of a filamentary medium. A proximal portion of the filamentary medium bends over a curved surface of the hemi-toroidal portion away from the through-hole while the distal portion of the filamentary medium is passed through the through-hole.

In still yet another embodiment of the present disclosure, an aircraft panel is provided for having a filamentary medium secured by an adapter. According to various embodiments, the panel has a front surface at a front side and a back surface at a back side. The panel also includes a first opening at the front surface for insertion of an illuminating device, a second opening at the back surface, and an adapter for routing the filamentary medium, without sharp bending or kinking thereof, from the back side towards the front side of the panel. The adapter comprises a body having an entrance end, where the entrance end includes a hemi-toroidal portion forming a through-hole in the body for receiving a distal portion of a filamentary medium. A proximal portion of the filamentary medium bends over a curved surface of the hemi-toroidal portion away from the through-hole while the distal portion of the filamentary medium is passed through the through-hole. When the adapter is inserted into the second opening, the filamentary medium is connected to the illuminating device.

BRIEF DESCRIPTION OF THE DRAWINGS

The disclosure may best be understood by reference to the following description taken in conjunction with the accompanying drawings, which illustrate particular embodiments of the present disclosure.

DETAILED DESCRIPTION OF PARTICULAR EMBODIMENTS

Figure 1:
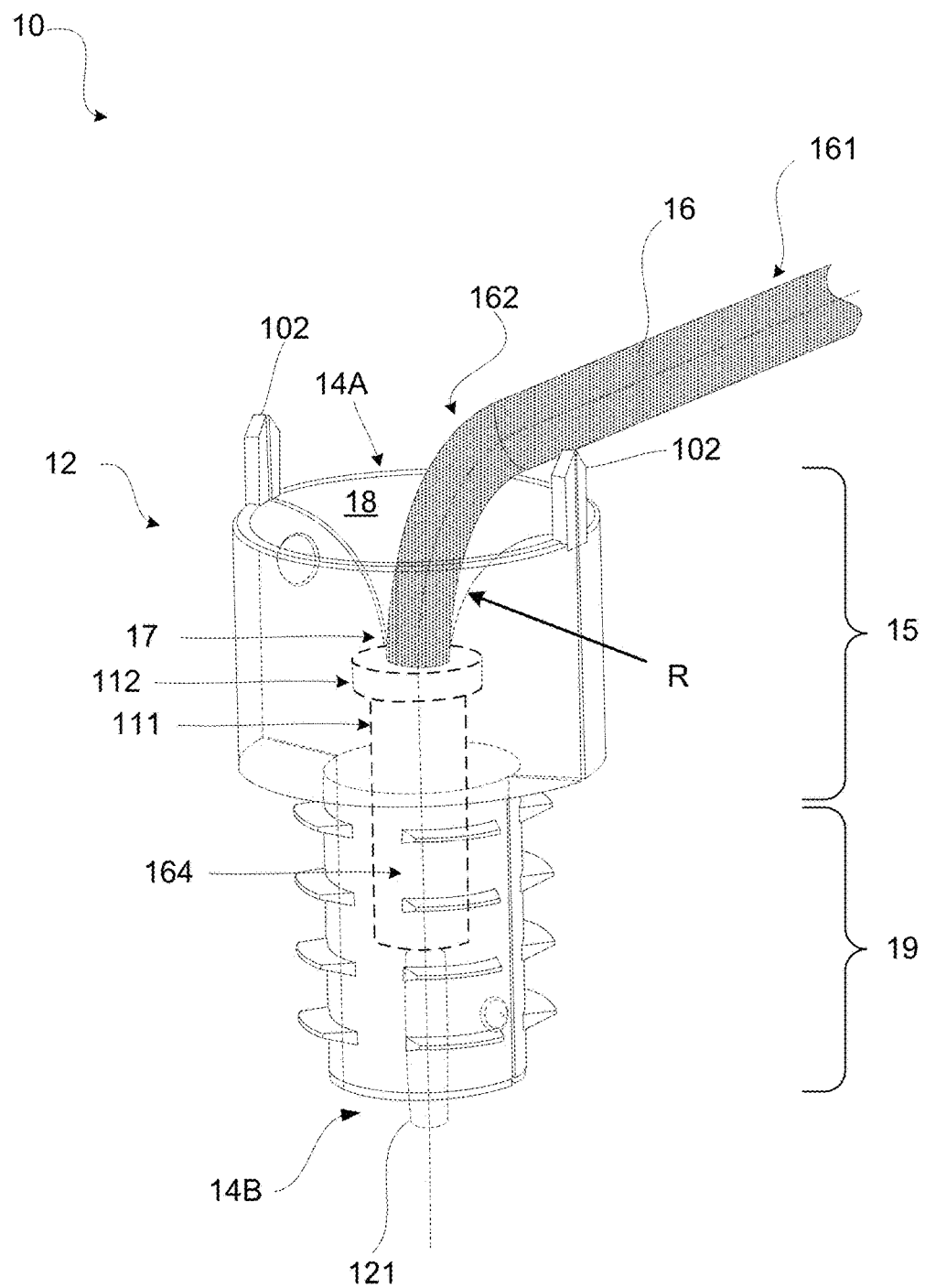
FIG. 1 illustrates a perspective view of an example of an adapter receiving a cable, in accordance with one or more embodiments of the present disclosure.

Reference will now be made in detail to some specific examples of the present disclosure including the best modes for carrying out the systems and methods provided in the present disclosure. Examples of these specific embodiments are illustrated in the accompanying drawings. While the present disclosure is described in conjunction with these specific embodiments, it will be understood that it is not intended to limit the present disclosure to the described embodiments. On the contrary, it is intended to cover alternatives, modifications, and equivalents as may be included within the spirit and scope of the present disclosure as defined by the appended claims.

In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

The present disclosure provides an adapter for routing, supporting and protecting filamentary media to prevent sharp bends or kinking therein. A filamentary medium can be any type of medium having a critical radius, the compliance of which is needed in order to avoid loss or degradation of signal transmitted along the medium. For example, such filamentary media can be optical fibers for use in optical communication networks or telecommunication systems.

In some embodiments, the adapter has a body having an entrance end comprising a toroidal or hemi-toroidal portion to form a through-hole in the body for receiving a distal portion of a filamentary medium. A proximal portion of the filamentary medium bends over a curved surface of the toroidal or hemi-toroidal portion away from the through-hole, while the distal portion of the filamentary medium is passed through the through-hole. In some embodiments, the entrance end is formed by a first part and a second part of the body for mating together, each of the first part and the second part including a corresponding toroidal or hemi-toroidal half portion that forms the toroidal or hemi-toroidal portion of the body when the first part and second part are mated. In some embodiments, the body itself is in the form of a toroidal or a hemi-toroidal or a section of a toroidal or hemi-toroidal including a curved surface of its inner hollow space.

Example Embodiments

FIG. 1 illustrates a perspective view of an example of an adapter receiving an optical fiber cable in accordance with one or more embodiments of the present disclosure. In particular, adapter 10 comprises a body 12 having a hemi-toroidal portion 15 at an entrance end 14A and a mounting mechanism 19 at an exit end 14B. Hemi-toroidal portion 15 has a generally cylindrical shape at exterior, and a curved surface 18 forming a through-hole 17 at interior. Curved surface 18 has a radius of curvature (R) that is no less than a critical radius of optical fibers to be routed or guided through adapter 10. As shown herein, a distal portion 162 of an optical fiber cable 16 is received at entrance end 14A of adapter 10. Optical fiber cable 16 is guided generally along curved surface 18 downwardly and to pass through through-hole 17 into body 12 at distal portion 162, while an proximal portion 161 bends upwardly away from through-hole 17.

Figure 2:
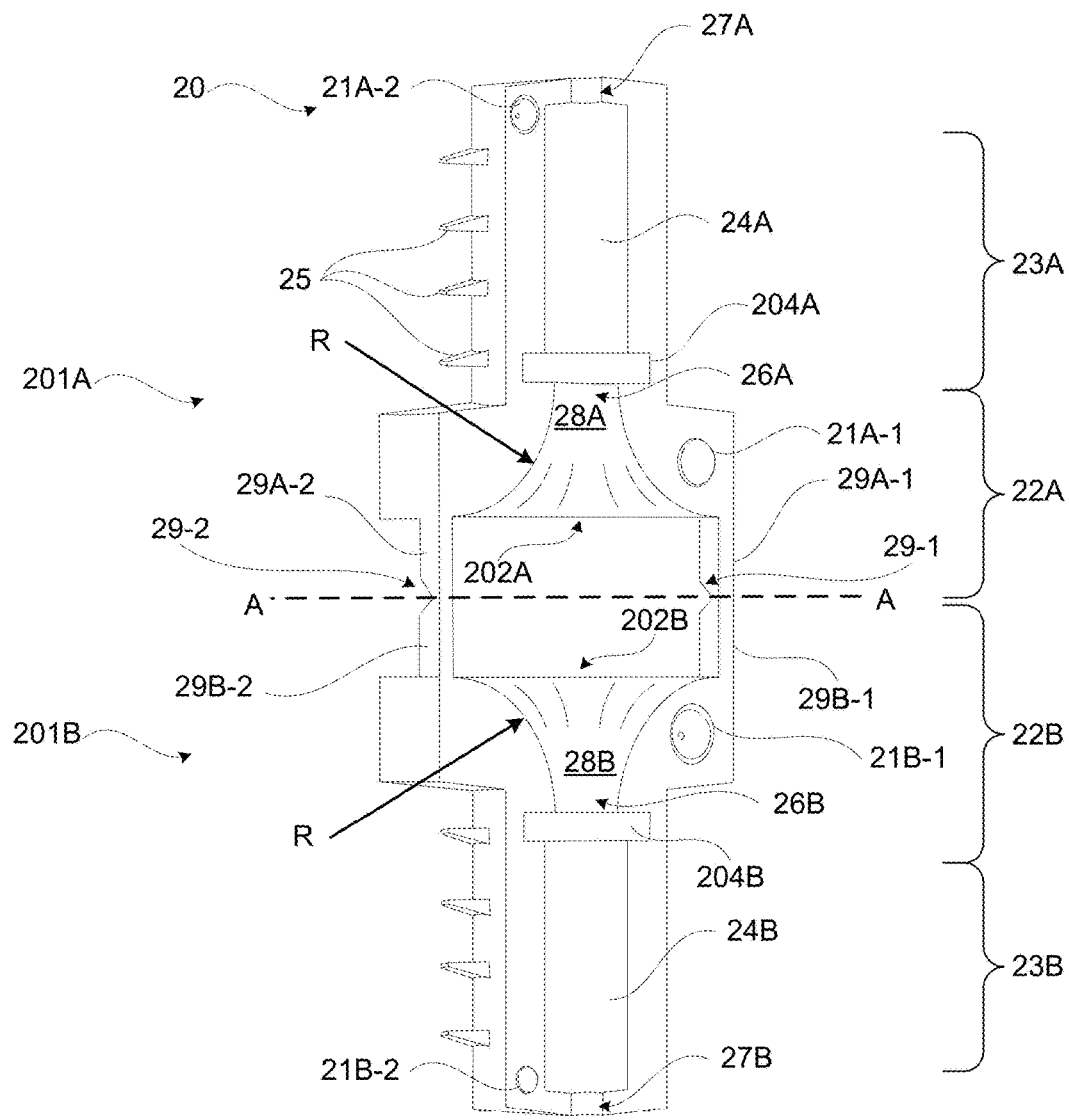
FIG. 2 illustrates a cross sectional view of an example of an adapter unfolded and without receiving a cable, in accordance with one or more embodiments of the present disclosure.

In some embodiments, adapter 10 comprises a generally centrally disposed slot (formed by 24A and 24B as shown in FIG. 2) for housing a ferrule assembly 111 that holds and surrounds a portion 164 of optical fiber cable 16 therein so as to terminate the optical fiber cable and keep it properly disposed inside adapter 10. Ferrule 111 can be made of any suitable materials such as plastic or metal. In some embodiments, ferrule assembly 111, generally cylindrical and having a collar 112, is disposed in interference fit with the slot and a recess (formed by 204A and 204B as shown in FIG. 2). In some embodiments, adapter 10 includes an elongated opening (shown in FIG. 2) extending towards exit end 14B such that to receive at least a portion of an optical fiber connecting element such as a light pipe 121 in proximity with optical fiber cable 16 in adapter 10.

In some embodiments, where entrance end 14A is formed by a first part and a second part (as shown in FIG. 2 in below) joined for mating together by a pair of connectors, e.g., a pair of living hinges 102, which may be retained after the first part and second part fold together along the hinges 102 to form adapter 10.

Hemi-toroidal portion 15 can be a configuration that is generally a hemi-torus or torus. Hemi-toroidal portion 15 can also be a configuration that is a section of a hemi-torus or torus having a curved surface surrounding its inner hollow space. As shown here in FIG. 1, hemi-toroidal portion 15 has a cross section profile that is of a section of a hemi-torus, which retains the inner hollow space and curved surface forming the inner hollow space. In some embodiments, hemi-toroidal portion 15 can also be, for example, a quarter of a hemi-torus, one third of a hemi-torus, or the like.

FIG. 2 illustrates a cross sectional view of an example of an unfolded adapter without receiving a cable, in accordance with one or more embodiments of the present disclosure. Adapter 20 comprises a first part 201A and a second part 201B, which fold along the line A-A, where a living hinge 29-1 is formed by a pair of living hinge portions 29A-1 and 29B-1, and a living hinge 29-2 is formed by a pair of living hinge portions 29A-2 and 29B-2, respectively. In some embodiments, first part 201A and second part 201B are generally symmetrical in structure except for their respective locking mechanism. As shown herein, first part 201A comprises extrusion 21A-1 for mating or locking with the corresponding dimple 21B-1 of second part 201B. Furthermore, second part 201B comprises extrusion 21B-2 for mating or locking with the corresponding dimple 21A-2 of first part 201A. In a folded state, extrusion 21A-1 mates with dimple 21B-1 to lock half hemi-torus portion 22A of first part 201A to the corresponding other half hemi-torus portion 22B of second part 201B; while extrusion 21B-2 mates with dimple 21A-2 to lock half mounting mechanism 23A of first part 201A to the corresponding other half mounting mechanism 23B of second part 201B.

First part 201A comprises an entrance end 202A at which a hemi-toroid half portion 22A, having a curved surface 28A, forms a half through hole 26A; while second part 201B comprises an entrance end 202B at which a hemi-toroid half portion 22B, having a curved surface 28B, forms a half through hole 26B. First part 201A also includes a half slot 24A and accordingly second part 201B includes a corresponding half slot 24B. In some embodiments, first part 201A further includes a half recess 204A while second part 201B includes a corresponding half recess 204B. In some embodiments, first part 201A further includes a half opening 27A while second part 201B includes a corresponding half opening 27B. In a folded state where extrusions 21A-1 and 21B-2 and dimples 21B-1 and 21A-2 hold first part 201A and second part 201B mated together, half hemi-toroidal portions 22A and 22B form a hemi-torus, half through holes 26A and 26B form a through hole, half slots 24A and 24B form a slot, half recesses 204A and 204B form a recess, and half component openings 27A and 27B form a component opening.

As shown herein, first part 201A has a half mounting mechanism 23A while second part 201B has a corresponding half mounting mechanism 23B. When in a folded state, half mounting mechanisms 23A and 23B form a mounting mechanism that is generally cylindrical. Both 23A and 23B have a plurality of fins 25 disposed about the outer surface thereof for attaching adapter 20 onto an optical fiber connecting component bearing structure such as a panel. In some embodiments, the mounting mechanism does not have fins, but rather includes other mechanisms for mounting the adapter to a panel slot, e.g. a screw-like outer surface. In FIG. 2, the ferrule slot, formed by half slots 24A and 24B, extends downwardly from through-hole inside mounting mechanism and opens to opening formed by half openings 27A and 27B towards exit end. Recess formed by half recesses 204A and 204B interference fits a collar of a ferrule assembly (shown in FIG. 1) such that the ferrule assembly holding an optical fiber cable is secured in place inside adapter 20.

Curved surface 28A and 28B have a radius of curvature (R) no less than a critical radius of the optical fibers to be routed or supported by adapter 20. In some embodiments, when the to-be-routed optical fiber cable has a diameter of r, Radius R can be configured at a value twice of the diameter r multiplied by a safety factor. In some embodiment, the safety factor can be about 25%, 28%, or 30%. Therefore, extending generally along curved surfaces 28A and 28B, the cable can be routed and supported in compliance of radius R, without too sharp bending or kinking of the fiber.

The two hinges 29-1 and 29-2 are disposed diametrically across from each other at the outermost perimeter of first part 201A and second part 201B. Hinge portions 29A-1, 29A-2, 29B-1 and 29B-2 have a height H such that, when in a unfolded state, the outermost perimeter of first part 201A and second part 201B form an opening of a height of 2*H, which is of a value that allows an optical fiber cable to pass therethrough. In some embodiments, hinge portions 29A-1, 29A-2, 29B-1 and 29B-2 can be removed in a folded state after an optical fiber cable being guided through adapter 20 such that the optical fiber cable is free to move about curved surfaces 28A and 28B, absent hinge portions extruding upwardly from the uppermost perimeter of adapter 20.

In some embodiments, adapter 20 can be formed from a single molded piece or multiple molded pieces able to snap into place with each other. Such piece or pieces can be formed with materials of relative stiffness for providing sufficient resilience to support optical fiber cables guided or routed thereby. For example, adapter 20 can be made of plastic, elastomeric, or the like. In some embodiments, through-hole embraces an optical fiber cable in a substantially interference fit before the optical fiber cable is inserted into a ferrule assembly.

Figures 3A, 3B:
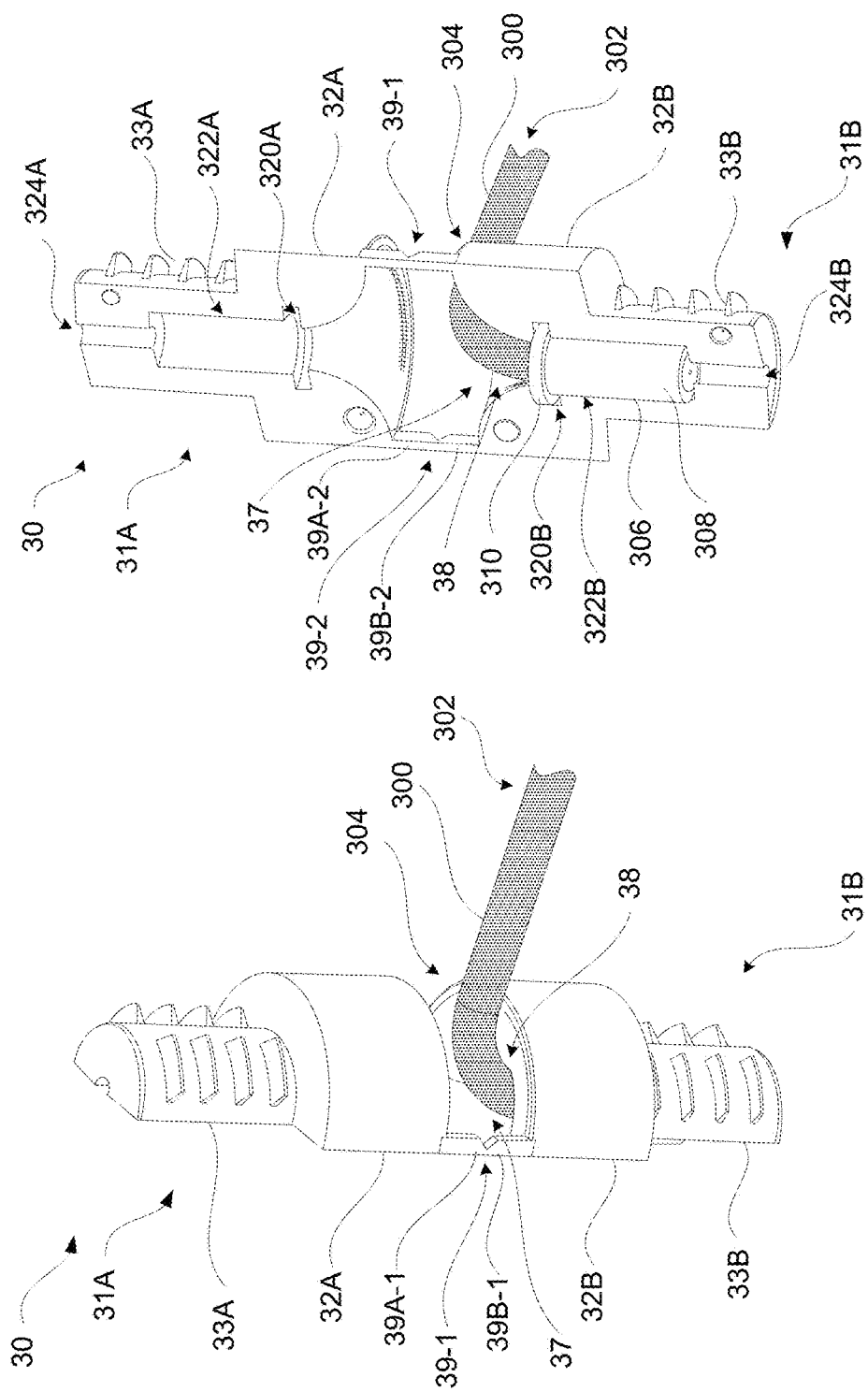
FIG. 3A illustrates a side view of an example of an adapter unfolded and receiving a cable, in accordance with one or more embodiments of the present disclosure.
FIG. 3B illustrates another side view of an example of an adapter unfolded and receiving a cable, in accordance with one or more embodiments of the present disclosure.

FIG. 3A illustrates a side view of an example of an adapter receiving an optical fiber cable in an unfolded state in accordance with one or more embodiments of the present disclosure. Adapter 30 comprises a body having a first part 31A and a second part 31B, which join at a pair of living hinges 39-1 (shown in both FIGS. 3A and 3B) and 39-2 (shown in FIG. 3B), which allows the first part and second part to mate or lock to each other in a folded state. Hinge 39-1 comprises hinge portions 39A-1 and 39B-1, while hinge 39-2 comprises hinge portions 39A-2 and 39B-2 (shown in FIG. 3B). First part 31A includes a hemi-toroidal half 32A and a mounting mechanism half 33A; while second part 31B includes a hemi-toroidal half 32B and a mounting mechanism half 33B. In a folded state, hemi-toroidal halves 32A and 32B form a hemi-toroidal portion of adapter 30, while mounting mechanism halves 33A and 33B form a mounting mechanism of adapter 30. As shown herein, an optical fiber cable 300 is inserted inwardly and downwardly, at a distal portion 304, into entrance space at an entrance end 37. The height of the entrance space is defined by the height of hinge portion 39A-1 plus the height of hinge portion 39B-1. Distal portion 304 rests generally upon curved surface 38 of second part 31B and is limited in movement upon curved surface 38 by two pairs of hinges. Proximal portion 302 of optical fiber cable 300 bends away from curved surface 38 and adapter 30.

FIG. 3B illustrates another side view of an example of the adapter of FIG. 3A receiving an optical fiber cable in an unfolded state in accordance with one or more embodiments of the present disclosure. As shown herein, upon routed inwardly and downwardly passing through-hole, a portion 308 of distal portion 304 of optical fiber cable 300 can be inserted into an opening end of a cylindrical ferrule assembly 306 at a collar 310 to be cladded or housed inside of ferrule assembly 306, while proximal portion 302 of optical fiber cable 300 bends away from curbed surface 38 and adapter 30. When in a unfolded state of adapter 30, collar 310 snaps into half recess 320B of second part 31B and ferrule assembly 306 snaps in half slot 322B of second part 31B, both in interference fit. When in a folded state of adapter 30, collar 310 also snaps into half recess 320A of first part 31A and ferrule assembly 306 snaps into half slot 322A of first part 31A, again both in interference, such that collar 310 secures the disposition of ferrule assembly 306 in place inside adapter 30. In some embodiments, when in an unfolded state of adapter 30, optical fiber connecting element such as a light pipe (not shown) is inserted into half opening 324B of second part 31B to come in contact and optical connection with optical fiber 300. When in a folded state of adapter 30, light pipe snaps into half opening 324A of first part 31A in an interference fit.

Figure 3C:
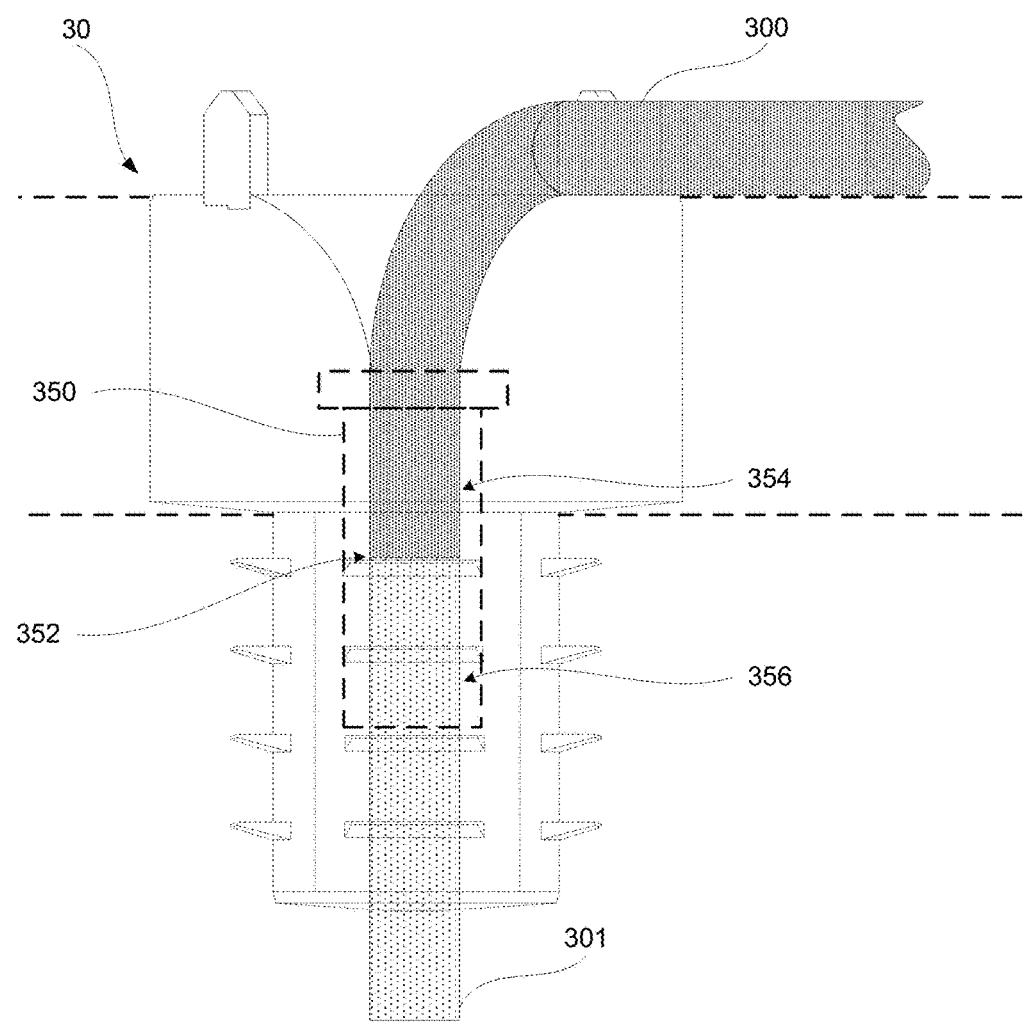
FIG. 3C illustrates yet another side view of an example of an adapter with both ends folded together and receiving two cables, in accordance with one or more embodiments of the present disclosure.

FIG. 3C illustrates a perspective view of an example of an adapter receiving and connecting two optical fiber cables in accordance with one or more embodiments of the present disclosure. In an unfolded state, adapter 30 comprises an upper portion and a lower portion, the upper portion or both upper and lower portions having a hemi-toroidal profile in cross section. Similarly, the upper portion and the lower portion can be connected at a pair of living hinges located diametrically across to each other on the uppermost surface of the upper portion. As shown herein, a first optical cable 300 is received at entrance end of adapter 30 and routed along a curved surface inwardly and downwardly through an upper through-hole. Ferrule assembly 350 is disposed inside a slot with a collar of ferrule assembly 350 securing the ferrule assembly in place inside adapter 30. A second optical fiber 301 is received at the entrance end of the lower portion and ferrule 350 houses a portion 356 of second optical fiber 301, which connects with a portion 354 of first optical fiber 300 at about a middle point 352 of ferrule 350.

In some embodiments, upper portion and lower portions can both be hemi-toroidal in a cross section profile. Upper portion and lower portion can also be of a configuration that is a section of a hemi-torus or torus having a curved surface of its inner hollow space. In some embodiments, upper and lower hemi-toroidal portions can also be, for example, a quarter of a hemi-torus, one third of a hemi-torus, or the like. In some embodiments, the lower portion can also be of any shape that is suited to house second optical fiber 301 for connecting to first optical fiber 300 inside ferrule assembly 350.

Figure 4A:
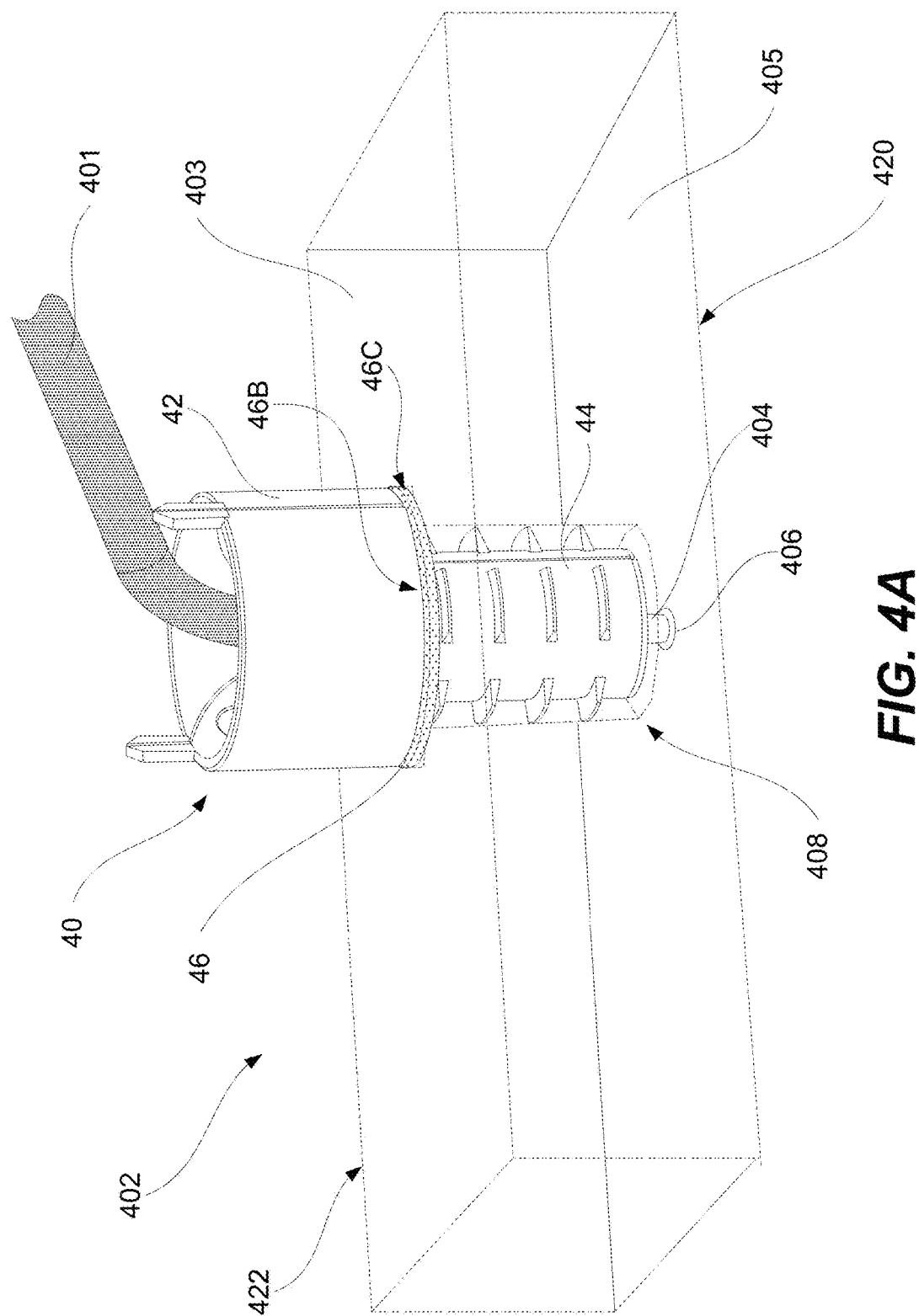
FIG. 4A illustrates a perspective view of an example of an adapter receiving a cable and mounted atop a panel having an element for connection to the cable, in accordance with one or more embodiments of the present disclosure.

FIG. 4A illustrates an example of an adapter receiving an optical fiber cable and mounted atop a panel, in accordance with one or more embodiments of the present disclosure. As partially shown herein, a panel lighting system for vehicles such as an aircraft benefits from the use of an adapter in accordance with one ore embodiments of the present disclosure. An illumination panel may be made from a suitable light weight but sturdy plastic, such as an extruded polystyrene foam, and, for minimization of weight while retaining strength and structural integrity, may be formed in a honeycomb pattern, regular or irregular, with an example of panel 402 shown herein. In some embodiments, the panel is sandwiched between a thin front film or skin with a decorative surface, on the front side viewed by the passenger when in use. The film may be made of a polyvinyl chloride or the like. The panel has a back film layer on the back side opposite from the viewed front side, which can be made from a suitable plastic material, such as nylon, to give the panel overall strength and toughness, while retaining some flexibility without allowing the honeycombed foam material to crack or split.

For illumination panel systems powered by optical fibers, an optical fiber cable 401 needs to be routed from the back side 422 (towards the ceiling for a ceiling panel) through the back film (not shown) on the back surface 403 of the panel 402 and at least partially through the panel 402 towards being coupled with the light pipe 404 configured on the front side 420 (towards the customers' overhead for the ceiling panel) of the panel 402. The optical fiber cable 401 is received and held in its appropriate length inside the adapter 40, which is inserted into a reception opening or hole 408 at the back side 422 of the panel 402. The adapter 40 may extend through the panel 402 at any length that is suitable for the light pipe 404 to be adapted for connecting with the optical fiber 401 held therein. The mounting mechanism 44 of the adapter 40 positions the adapter 40 securely in its place relative to the panel 402.

At the front side 420 of the panel, the light pipe 404 is adapted to be inserted to the light pipe opening 406 on the front surface 405 of the panel 402. In some embodiments, the light pipe 404 has a diameter which selectively positions the light pipe in a proper position relative to the front film and the light source. In some embodiments, the adapter 40 includes an exit end channel to house at least part of the light pipe 404 that is coupled to the optical fiber thereinside.

In particular, adapter 40 receives optical fiber cable 401 at its distal portion through its through-hole into ferrule assembly (not shown) housed inside adapter 40. As shown herein, mounting mechanism 44, adapted to have a plurality of locking fins about its exterior, is inserted into a reception opening 408, such as a cylindrical bore drilled in a panel 402 so that hemi-toroidal portion 42 mounts on top of a back surface 403 of panel 402, with hemi-toroidal portion 42 in flush with back surface 403. In some embodiments, reception opening 408 is only wide enough to fit mounting mechanism 44 without the locking fins. In other embodiments, the reception opening 408 has corresponding fin slots in the panel to receive the locking fins. In some embodiments, locking fins have a generally flat upper surface and a slightly curved lower surface to facilitate locking onto panel 402 such that effort to remove adapter 40 from the receptor hole 408 will cause fins to penetrate the sidewalls of receptor opening 408, further locking adapter in place.

In some embodiments, a gasket 46 is adapted around a portion 46B of hemi-toroidal portion 42 on the back surface 403 of a panel 402 to form a sealing engagement (46C) of both adapter 40 and panel 402.

In FIG. 4A, panel 402 is an example of an optical fiber coupling or bearing component. At the bottom surface of panel 402, an optical fiber cable connecting element such as a light pipe 404 is disposed in contact with optical fiber cable (not shown) inside adapter 40.

Figure 4B:
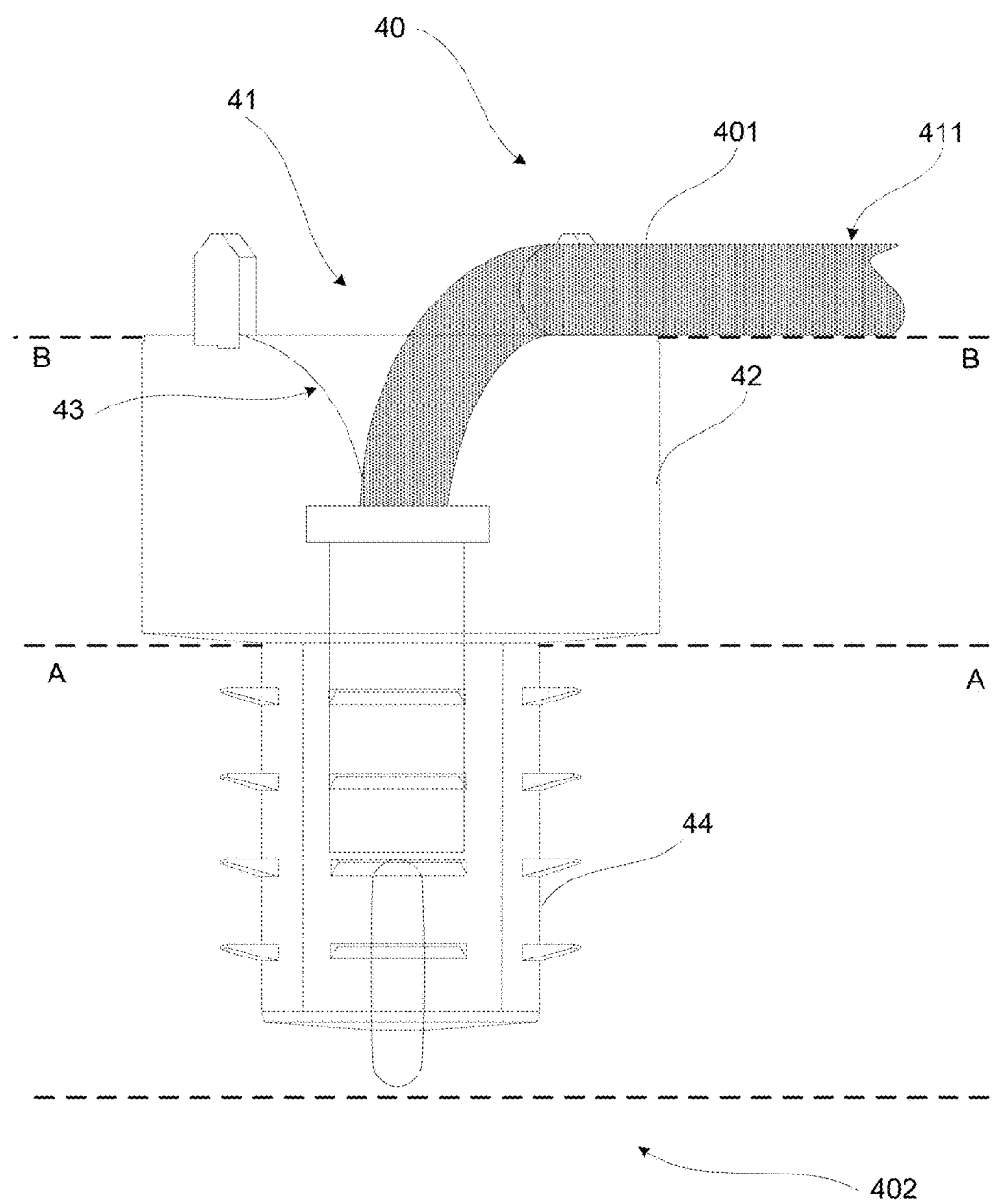
FIG. 4B illustrates a cross sectional view of examples of an adapter receiving a cable and mounted atop a panel having a component for coupling to the cable, in accordance with one or more embodiments of the present disclosure.

FIG. 4B illustrates a cross sectional view of an example of an adapter 40 receiving an optical fiber cable at entrance end 41 and affixed to a panel, in accordance with one or more embodiments of the present disclosure. Here, two arrangements of affixing adapter 40 onto panel 402 are shown in cross section with the line A-A and the line B-B defining upper surfaces of panel 402, respectively. Similar to FIG. 4A, in a configuration where a reception opening in panel 402 forms a counter bore for receiving the generally cylindrical mounting mechanism 44, adapter 40 rests on top of the upper surface of panel 402 at line A-A with the bottom surface of hemi-toroidal portion 42 being flush with line A-A and mounting mechanism 44 disposed inside the reception opening. In another configuration, panel 402 bears a reception opening that receives the entire body of adapter 40 such that the outermost perimeter of adapter 40 is flush with the upper surface of panel 402 along the line B-B. In the second configuration, a proximal portion 411 of optical fiber cable 401, extending away from curved surface 43, rests atop the upper surface of panel 402. In some embodiments not shown here, adapter 40 can be inserted to a counter bore in panel 402 that can receive any portion of adapter 40.

Figure 5A:
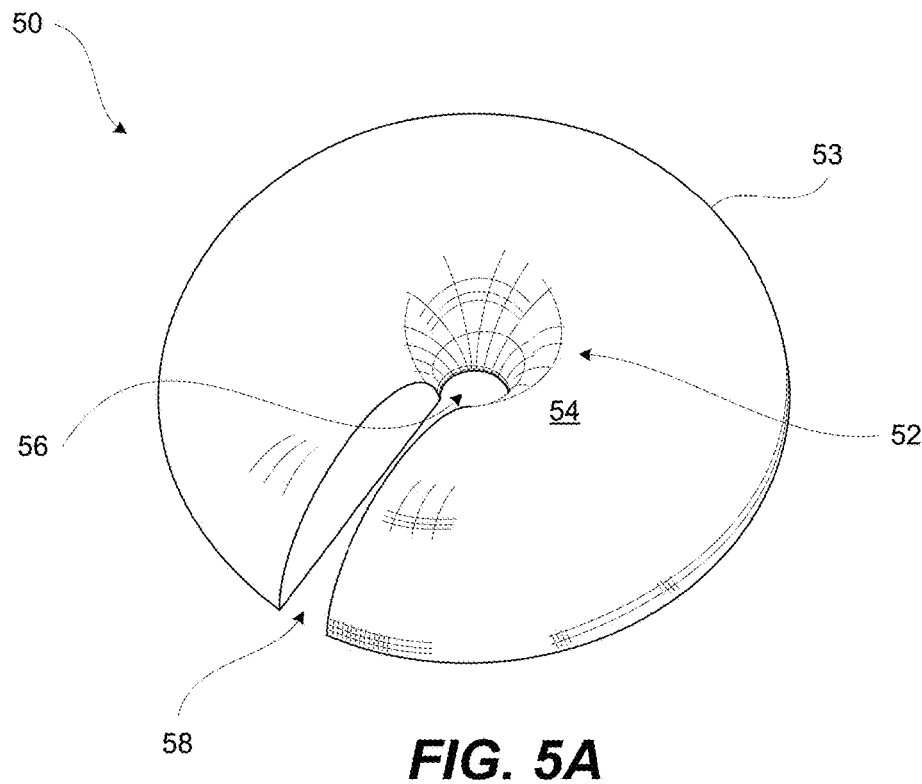
FIG. 5A illustrates a perspective view of another example of an adapter without receiving a cable, in accordance with one or more embodiments of the present disclosure.

FIG. 5A illustrates a perspective view of an example of an adapter in accordance with one or more embodiments of the present disclosure. Adapter 50 comprises a body 53 in the shape of a hemi-torus, e.g., the shape similar to one-half of a sliced donut. Adapter 50 comprises an entrance end 52, at which a curved surface 54 forms a through-hole 56 in its inner hollow space. In some embodiments, adapter 50 includes a gap 58 across the hemi-torus body, with an outer opening at the outermost perimeter of hemi-toroidal body 53 and an inner opening at the innermost perimeter of hemi-toroidal body 53. In some embodiments, gap 58 has a width that is at least sufficient to create an interference fit with an optical fiber cable that is to be routed through adapter 50.

Figure 5B:
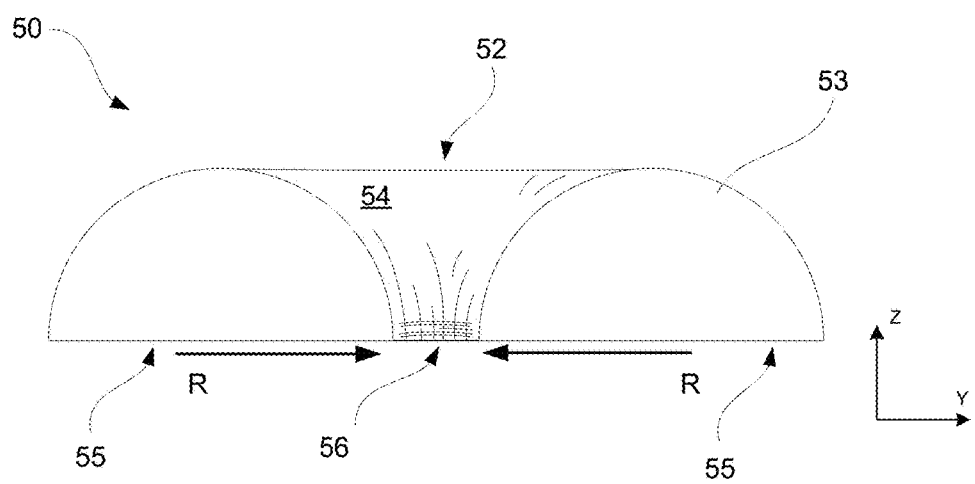
FIG. 5B illustrates a cross sectional view of another example of an adapter without receiving a cable, in accordance with one or more embodiments of the present disclosure.

FIG. 5B illustrates a cross sectional view of an example of an adapter in accordance with one or more embodiments of the present disclosure. Adapter 50 has a hemi-toroidal body 53 having a curved surface 54 at an entrance end 52, a through-hole 56 and a bottom surface 55. Curved surface 54 has of a Radius of curvature (R) that is no less than the critical radius of an optical fiber cable that is to be routed through adapter 50. In some embodiments, when the to-be-routed optical fiber cable has a diameter of r, Radius R can be configured at a value twice of the diameter r multiplied by a safety factor. In some embodiments, the safety factor can be about 25%, 28%, or 30%.

Figure 5C:
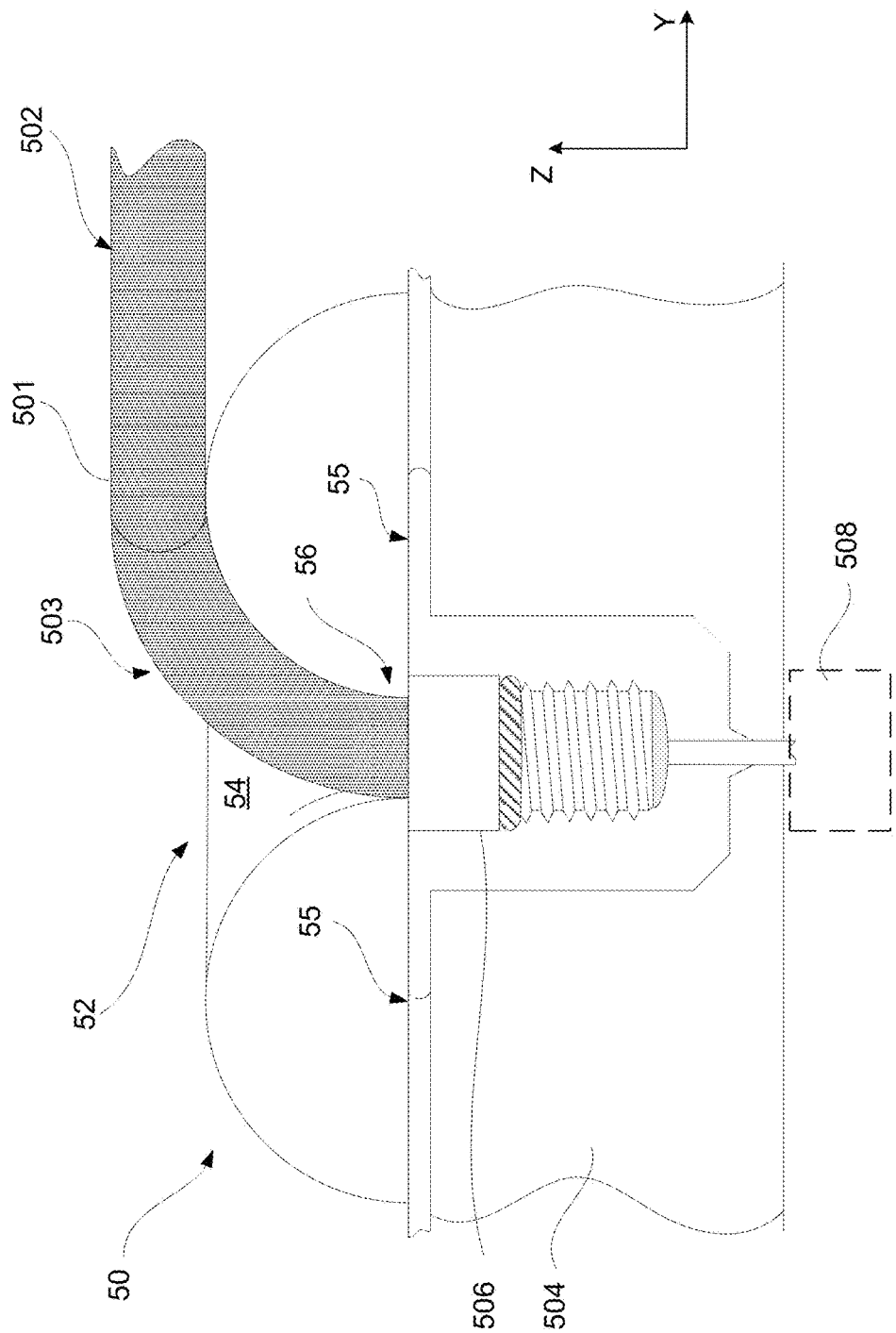
FIG. 5C illustrates a cross sectional view of another example of an adapter receiving a cable and mounted atop a panel having a component for coupling to the cable, in accordance with one or more embodiments of the present disclosure.

FIG. 5C illustrates a cross sectional view of an example of an adapter receiving an optical fiber cable and mounted atop a panel, in accordance with one or more embodiments of the present disclosure. Adapter 50 is disposed onto an upper surface of a panel 504 bearing a housing assembly 506 that is in contact with optical fiber cable 501 at a distal portion 503 thereof. Adapter 50 fits distal portion 503 of optical fiber cable 501 through its gap (not shown) such that optical fiber cable 501 is received at entrance end 52 and inside through-hole 56, while optical fiber cable 501 rests generally along curved surface 54 with a proximal portion 502 of optical fiber cable 501 bending upwardly away from adapter 50. In some embodiments, after receiving optical fiber cable 501 as described hereinabove, bottom surface 55 of adapter 50 is attached onto the upper surface of panel 504 to secure the cable-supporting adapter in place. In some embodiments, adapter 50 is secured via a mounting mechanism, e.g. an adhesive. In some embodiments, adapter 50 is retro-fitted onto the access juncture at which an optical fiber cable, as shown in FIG. 5C, is already connected to a component and extends outwardly and upwardly out of panel 504. In some embodiments, adapter 50 routes a distal portion of an optical fiber cable along curved surface 54 into through-hole 56 prior to the distal portion of the optical fiber cable being connected to an optical-fiber-coupling component 508 or just open air (e.g. cabin side).

Figure 6:
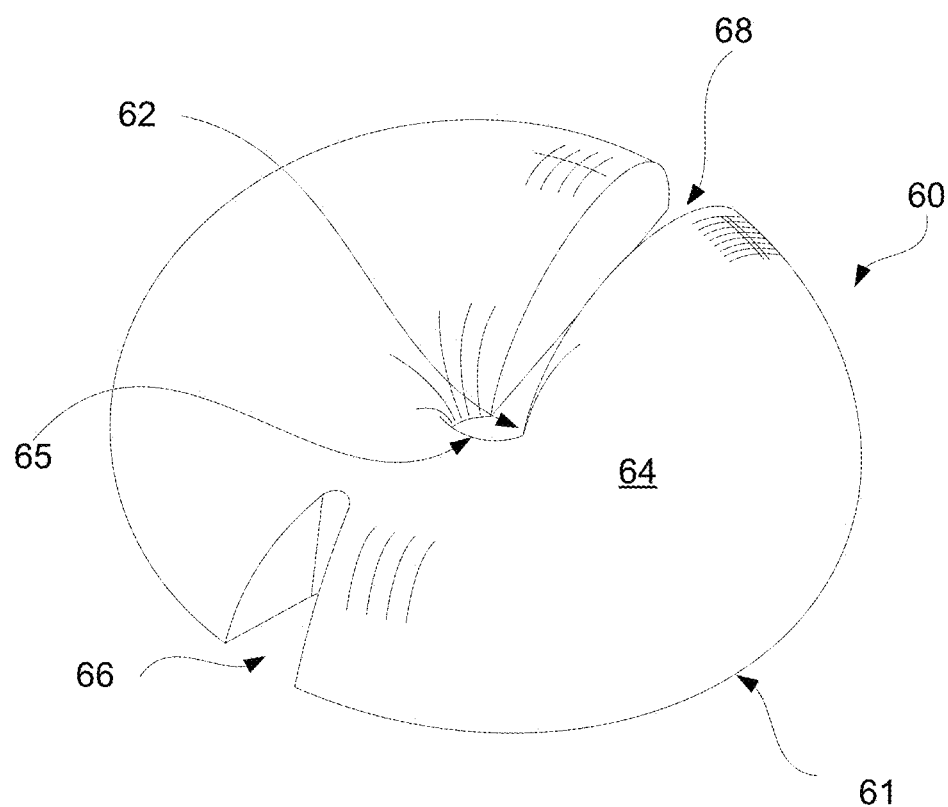
FIG. 6 illustrates a perspective view of another example of an adapter without receiving a cable, in accordance with one or more embodiments of the present disclosure.

FIG. 6 illustrates a perspective view of an example of an adapter in accordance with one or more embodiments of the present disclosure. Adapter 60 has body 61 in the shape of a hemi-torus having a curved surface 64 at an entrance end 62. Adapter 60 has an inner hollow space forming a through-hole 65 for receiving an optical fiber cable. Adapter 60 also has a gap 68 for fitting a cable though and into through-hole 65. In some embodiments, adapter 60 also has a notch 66 opposite to gap 68 on the hemi-toroidal body. Notch 66 extends partially into body 61 without reaching through-hole 65. In some embodiments, notch 66 is wedged shape, being wider towards the other perimeter of adapter 60 and narrowing while moving radially inward towards through-hole 65. In some embodiments, notch 66 serves the function of reducing physical strain on adapter 60 throughout the process of passing an optic fiber cable through gap 68 into through-hole 65. For example, if during the process of passing the optic fiber cable through gap 68, a force is applied to the ends of gap 68, thereby pulling gap 68 wider and deforming the original shape of adapter 60, notch 66 relieves strain by narrow its gap in complementary fashion, thus making it easier to widen gap 68. After the optic fiber cable passes by gap 68 and is securely wedged in through-hole 65, the force pulling on adapter 60 is released and adapter 60, including notch 66, returns to its original undeformed shape.

Examples of Aircraft and Methods of Fabricating and Operating Aircraft

Figure 7:
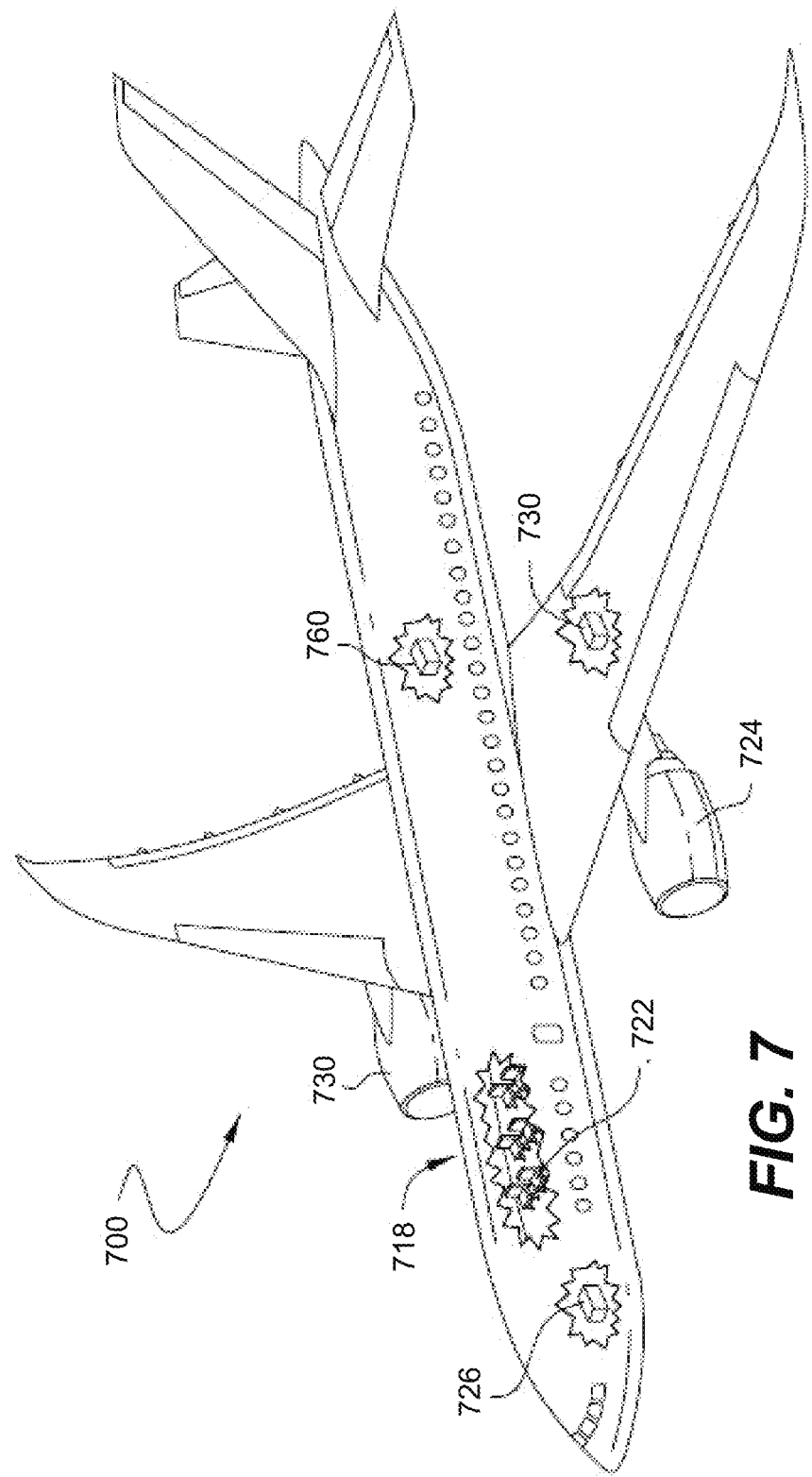
FIG. 7 is a schematic illustration of an aircraft, in accordance with one or more embodiments of the present disclosure.

To better understand various aspects of implementation of the described systems and techniques, a brief description of an aircraft and aircraft wing is now presented. FIG. 7 is a schematic illustration of aircraft 700, in accordance with some embodiments. As depicted in FIG. 7, aircraft 700 is defined by a longitudinal axis (X-axis), a lateral axis (Y-axis), and a vertical axis (Z-axis). In various embodiments, aircraft 700 comprises airframe 750 with interior 770. Aircraft 700 includes wings 720 coupled to airframe 750. Aircraft 700 may also include engines 730 supported by wings 720. In some embodiments, aircraft 700 further includes a number of high-level inspection systems such as electrical inspection system 740 and environmental inspection system 760. In other embodiments, any number of other inspection systems may be included.

Aircraft 700 shown in FIG. 7 is one example of a vehicle of which components may be utilized with the disclosed systems and/or devices, in accordance with illustrative embodiments. Although an aerospace example is shown, the principles disclosed herein may be applied to other industries, such as the automotive industry. Accordingly, in addition to aircraft 700, the principles disclosed herein may apply to other vehicles, e.g., land vehicles, marine vehicles, space vehicles, etc.

Figure 8:
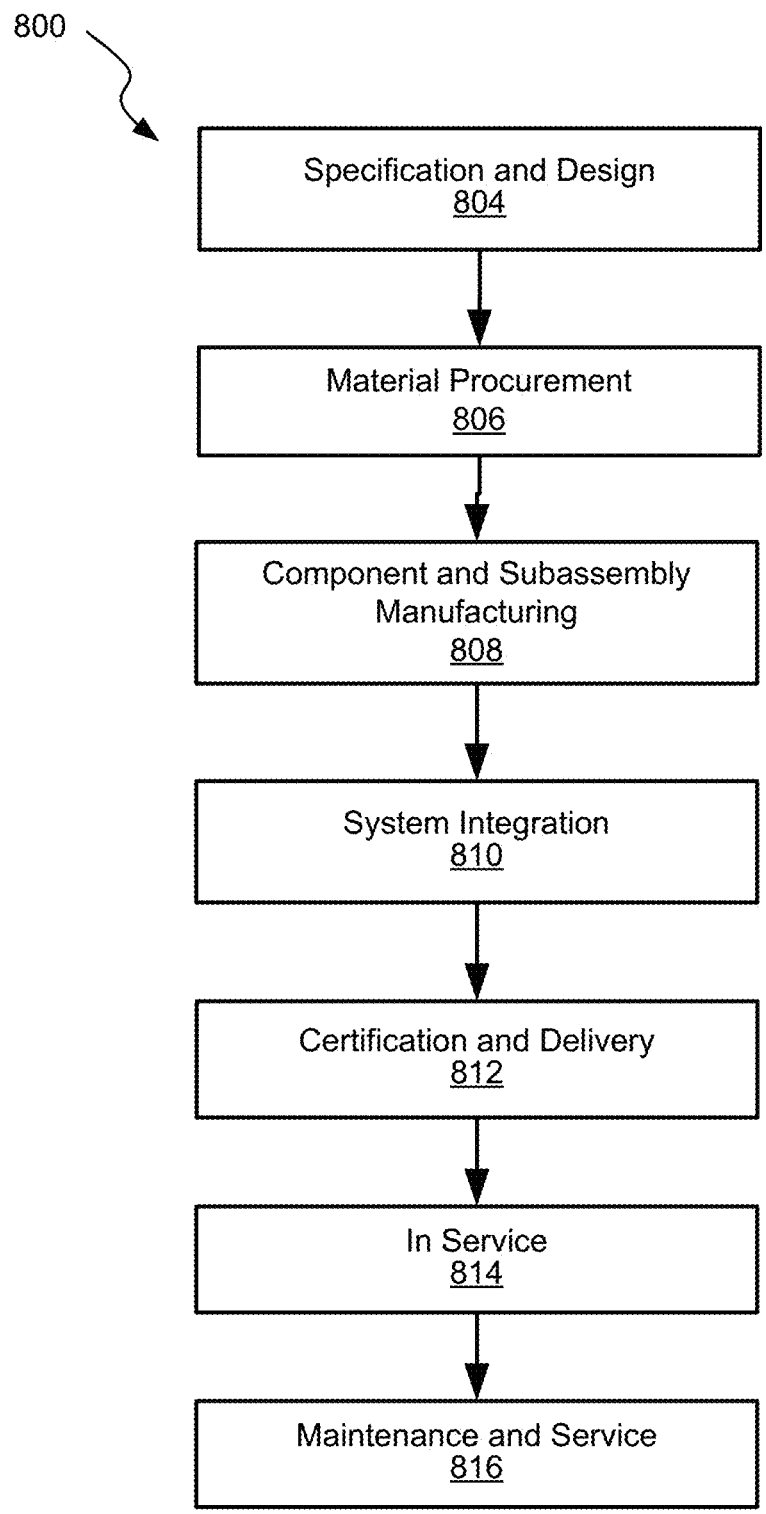
FIG. 8 is a block diagram of aircraft production and service methodology that may utilize methods and assemblies described herein.

Examples of the present disclosure may be described in the context of aircraft manufacturing and service method 800 as shown in FIG. 8 and aircraft 700 as shown in FIG. 7. During pre-production, illustrative method 800 may include specification and design (block 804) of aircraft 700 and material procurement (block 806). During production, component and subassembly manufacturing (block 808) and inspection system integration (block 810) of aircraft 700 may take place. Described methods, and assemblies formed by these methods, can be used in any of specification and design (block 804) of aircraft 700, material procurement (block 806), component and subassembly manufacturing (block 808), and/or inspection system integration (block 810) of aircraft 700.

Thereafter, aircraft 700 may go through certification and delivery (block 812) to be placed in service (block 814). While in service, aircraft 700 may be scheduled for routine maintenance and service (block 816). Routine maintenance and service may include modification, reconfiguration, refurbishment, etc. of one or more inspection systems of aircraft 700. Described methods, and assemblies formed by these methods, can be used in any of certification and delivery (block 812), service (block 814), and/or routine maintenance and service (block 816).

Each of the processes of illustrative method 800 may be performed or carried out by an inspection system integrator, a third party, and/or an operator (e.g., a customer). For the purposes of this description, an inspection system integrator may include, without limitation, any number of aircraft manufacturers and major-inspection system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of manufacturing and service method (illustrative method 800). For example, components or subassemblies corresponding to component and subassembly manufacturing (block 808) may be fabricated or manufactured in a manner similar to components or subassemblies produced while aircraft 700 is in service (block 814). Also, one or more examples of the apparatus(es), method(s), or combination thereof may be utilized during production stages (block 808) and (block 810), for example, by substantially expediting assembly of or reducing the cost of aircraft 700. Similarly, one or more examples of the apparatus or method realizations, or a combination thereof, may be utilized, for example and without limitation, while aircraft 700 is in service (block 814) and/or during maintenance and service (block 816).

While the present disclosure has been particularly shown and described with reference to specific embodiments thereof, it will be understood by those skilled in the art that changes in the form and details of the disclosed embodiments may be made without departing from the spirit or scope of the present disclosure. It is therefore intended that the present disclosure be interpreted to include all variations and equivalents that fall within the true spirit and scope of the present disclosure. Although many of the components and processes are described above in the singular for convenience, it will be appreciated by one of skill in the art that multiple components and repeated processes can also be used to practice the techniques of the present disclosure.

The invention claimed is:

1. An adapter, comprising:
   a body (12) having an entrance end (14A),
   wherein the entrance end includes a hemi-toroidal portion (15) forming a through-hole (17) in the body for receiving a distal portion (162) of a filamentary medium (16), wherein a proximal portion (161) of the filamentary medium bends over a curved surface (18) of the hemi-toroidal portion away from the through-hole while the distal portion of the filamentary medium is passed through the through-hole, wherein a radius (R) of the curved surface is no less than a critical radius of the filamentary medium, wherein the curved surface leads to a ferrule shaped recess in the adapter configured to couple with a ferrule, wherein an outer surface of a portion of the body containing the ferrule shaped recess includes a plurality of fins for secure attachment onto an aircraft panel,
   wherein the body further comprises a first part (201A) and a second part (201B) being joined together by a hinge portion (29A-1, 29A-2, 29B-1, and 29B-2), the hinge portion including a living hinge (29-1, 29-2).

2. The adapter of claim 1, wherein the entrance end is formed by the first part (201A) and the second part (201B) of the body when mated together, each of the first part and the second part includes a corresponding hemi-toroidal half portion (22A and 22B) that forms the hemi-toroidal portion of the body when the first part and second part are mated.

3. The adapter of claim 2, wherein the first part (201A) and the second part (201B) mate together when folded along the living hinge (29-1, 29-2).

4. The adapter of claim 3, wherein the hinge portion is removed after mating.

5. The adapter of claim 1, further comprising a slot (24A and 24B) in the body for receiving a ferrule (111) for surrounding a portion (164) of the filamentary medium, the ferrule, once engaged with the adapter, being disposed at least partially within the body for holding a portion (164) of the filamentary medium, the ferrule having a collar portion (112) corresponding to a recess (204A and 204B) in the body to secure the ferrule in place.

6. The adapter of claim 5, wherein the filamentary medium is a first fiber-optic cable (16).

7. The adapter of claim 6, wherein the ferrule holds a first end portion (354) of the first fiber-optic cable about a mid-point (352) of the ferrule, and wherein the ferrule is adapted to receive a second end portion (356) of a second fiber-optic cable (301) so the first end portion and the second end portion are in optical communication with each other.

8. The adapter of claim 1, further comprising a gasket member (46) for surrounding a portion (46B) of the body to form a seal (46C) when the body is in contact with a corresponding component (402).

9. The adapter of claim 1, wherein the radius of the curved surface is no less than 1.25× of the critical radius of the filamentary medium.

10. The adapter of claim 1, wherein the radius is no less than twice a diameter of the filamentary medium plus a predetermined safety factor.

11. The adapter of claim 10, wherein the safety factor is at least 25%.

12. The adapter of claim 1, wherein the body further comprises a mounting mechanism (19) for securing the adapter to a filamentary medium coupling component (402).

13. The adapter of claim 12, wherein the mounting mechanism includes a plurality of fins (25) for locking a portion (19) of the body in place with the filamentary medium coupling component.

14. The adapter of claim 12, wherein the mounting mechanism includes an attachment surface (55) for attaching the adapter onto the filamentary medium coupling component.

15. A method comprising:
securing a filamentary medium (16), without sharp bending or kinking thereof, to a filamentary medium coupling component (402) by use of an adapter (10), the adapter comprising:
a body (12) having an entrance end (14A),
wherein the entrance end includes a hemi-toroidal portion (15) forming a through-hole (17) in the body for receiving a distal portion (162) of the filamentary medium, wherein a proximal portion (161) of the filamentary medium bends over a curved surface (18) of the hemi-toroidal portion away from the through-hole while the distal portion of the filamentary medium is passed through the through-hole, wherein a radius (R) of the curved surface is no less than a critical radius of the filamentary medium, wherein the curved surface leads to a ferrule shaped recess in the adapter configured to couple with a ferrule, wherein an outer surface of a portion of the body containing the ferrule shaped recess includes a plurality of fins for secure attachment onto an aircraft panel,
wherein the body further comprises a first part (201A) and a second part (201B) being joined together by a hinge portion (29A-1, 29A-2, 29B-1, and 29B-2), the hinge portion including a living hinge (29-1, 29-2).

16. The method of claim 15, wherein the entrance end is formed by the first part (201A) and the second part (201B) of the body when mated together, each of the first part and the second part includes a corresponding hemi-toroidal half portion (22A and 22B) that forms the hemi-toroidal portion of the body when the first part and second part are mated.

17. The method of claim 15, wherein the adapter further comprises a slot (24A and 24B) in the body for receiving a ferrule (111) for surrounding a portion (164) of the filamentary medium, the ferrule, once engaged with the adapter, being disposed at least partially within the body for holding a portion (164) of the filamentary medium, the ferrule having a collar portion (112) corresponding to a recess (204A and 204B) in the body to secure the ferrule in place.

18. The method of claim 15, wherein the filamentary medium is a first fiber-optic cable (16).

19. An aircraft panel (402) having a front surface (405) at a front side (420) and a back surface (403) at a back side (422), the panel comprising:
a first opening (406) at the front surface for insertion of an illuminating device (404);
a second opening (408) at the back surface; and
an adapter (10), for routing a filamentary medium (401), without sharp bending or kinking thereof, from the back side towards the front side, the adapter comprising:
a body (12) having an entrance end (14A),
wherein the entrance end includes a hemi-toroidal portion (15) forming a through-hole (17) in the body for receiving a distal portion (162) of the filamentary medium, wherein a proximal portion (161) of the filamentary medium bends over a curved surface (18) of the hemi-toroidal portion away from the through-hole while the distal portion of the filamentary medium is passed through the through-hole, wherein the filamentary medium is connected to the illuminating device upon insertion of the adapter into the second opening, wherein a radius (R) of the curved surface is no less than a critical radius of the filamentary medium, wherein the curved surface leads to a ferrule shaped recess in the adapter configured to couple with a ferrule, wherein an outer surface of a portion of the body containing the ferrule shaped recess includes a plurality of fins for secure attachment onto the aircraft panel,
wherein the body further comprises a first part (201A) and a second part (201B) being joined together by a hinge portion (29A-1, 29A-2, 29B-1, and 29B-2), the hinge portion including a living hinge (29-1, 29-2).

20. The aircraft panel of claim 19, wherein the panel is a ceiling panel.

21. The aircraft panel of claim 19, wherein the entrance end is formed by the first part (201A) and the second part (201B) of the body when mated together, each of the first part and the second part includes a corresponding hemi-toroidal half portion (22A and 22B) that forms the hemi-toroidal portion of the body when the first part and second part are mated.

22. The aircraft panel of claim 19, wherein the body further comprises a mounting mechanism (44) for securing the adapter to the panel.

23. The aircraft panel of claim 19, wherein the filamentary medium is a first fiber-optic cable.

* * * * *